(12) United States Patent
Sato et al.

(10) Patent No.: US 11,507,051 B2
(45) Date of Patent: Nov. 22, 2022

(54) OBJECT SURFACE EVALUATION METHOD, EVALUATION DEVICE, WORKPIECE MACHINING METHOD USING SAID EVALUATION METHOD, AND MACHINE TOOL

(71) Applicant: MAKINO MILLING MACHINE CO., LTD., Tokyo (JP)

(72) Inventors: Ryuta Sato, Kobe (JP); Takumi Nakanishi, Kobe (JP); Mitsunari Oda, Kanagawa (JP); Nobu Nakayama, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 94 days.

(21) Appl. No.: 16/482,669

(22) PCT Filed: Feb. 5, 2018

(86) PCT No.: PCT/JP2018/003850
§ 371 (c)(1),
(2) Date: Jul. 31, 2019

(87) PCT Pub. No.: WO2018/147236
PCT Pub. Date: Aug. 16, 2018

(65) Prior Publication Data
US 2020/0192333 A1 Jun. 18, 2020

(30) Foreign Application Priority Data

Feb. 10, 2017 (JP) .............................. JP2017-023518

(51) Int. Cl.
*G05B 19/4093* (2006.01)
*G01B 11/30* (2006.01)

(52) U.S. Cl.
CPC ...... *G05B 19/40938* (2013.01); *G01B 11/303* (2013.01); *G05B 2219/35012* (2013.01); *G05B 2219/37365* (2013.01)

(58) Field of Classification Search
CPC .... G05B 19/40938; G05B 2219/35012; G05B 2219/37365; G05B 2219/37402;
(Continued)

(56) References Cited

U.S. PATENT DOCUMENTS

2010/0204814 A1* 8/2010 Neumaier ........ G05B 19/40937
700/164
2011/0096896 A1* 4/2011 Kunzmann .......... G01N 23/046
378/21
(Continued)

FOREIGN PATENT DOCUMENTS

JP 2012-084079 A 4/2012
JP 2016-142720 A 8/2016
(Continued)

OTHER PUBLICATIONS

R.L. Cook et al., "A Reflectance Model for Computer Graphics", ACM Transactions on Graphics, vol. 1(1): 7-24 (1982).
(Continued)

*Primary Examiner* — Kenneth M Lo
*Assistant Examiner* — Mohammed Shafayet
(74) *Attorney, Agent, or Firm* — Merchant & Gould P.C.

(57) ABSTRACT

A parameter indicating a surface property of an object surface is plotted on the horizontal axis, a normal direction change rate of the shape of the object surface is plotted on the vertical axis, the minimum normal direction change rate visible to a person is associated with the parameter indicating the surface property of the object surface to create a visible area map, the relationship between the parameter indicating the surface property of a machining surface of a
(Continued)

workpiece, and the maximum value of the normal direction change rate of the shape of the machining surface of the workpiece is displayed on the visible area map, and the object surface is evaluated.

12 Claims, 11 Drawing Sheets

(58) Field of Classification Search
CPC ............ G05B 19/41875; G05B 19/401; G05B 19/18; G05B 19/4069; G01B 11/303; G01B 5/28; G01B 11/30; G01N 21/8851; G01N 2021/8864; G01N 21/47; Y02P 90/02
USPC .......................................................... 700/173
See application file for complete search history.

(56) References Cited

U.S. PATENT DOCUMENTS

| | | | | |
|---|---|---|---|---|
| 2011/0320023 A1* | 12/2011 | Sullivan | ........... | G05B 19/41875 700/98 |
| 2014/0063852 A1* | 3/2014 | Iwasaki | ............... | G02B 6/0041 362/613 |
| 2014/0277686 A1* | 9/2014 | Wang | ................. | G05B 19/4093 700/160 |
| 2016/0003614 A1* | 1/2016 | Baath | ................... | G01B 11/306 356/601 |
| 2016/0054724 A1* | 2/2016 | Oda | ................... | G01N 21/4738 700/109 |

FOREIGN PATENT DOCUMENTS

| | | | | |
|---|---|---|---|---|
| WO | 2014/155727 A1 | 10/2014 | | |
| WO | WO-2014155727 A1 * | 10/2014 | ......... | G01N 21/4738 |
| WO | 2016/125797 A1 | 8/2016 | | |

OTHER PUBLICATIONS

T. Nakanishi et al., "Finished Surface Evaluation based on the Human Visual Characteristic—Influence of Surface Roughness onto the Recognition Limit of Normal Vector Changes-", 2016 Annual Precision Engineering Conference: 745-746 (2016).

International Search Report for PCT/JP2018/003850 dated Apr. 3, 2018.

* cited by examiner

FIG. 6
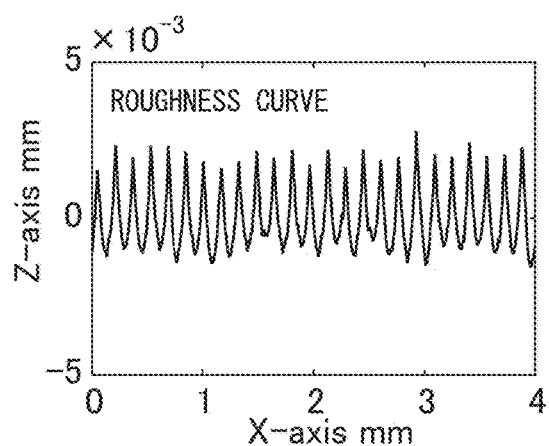
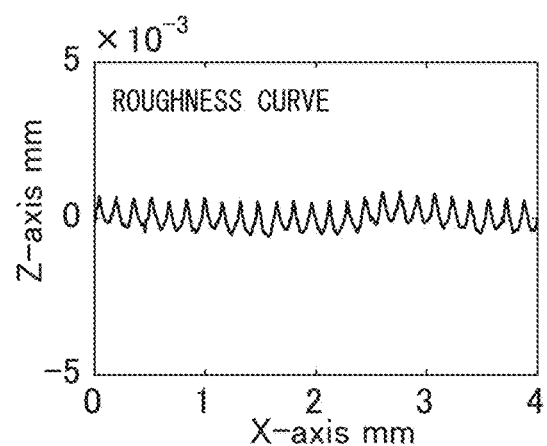
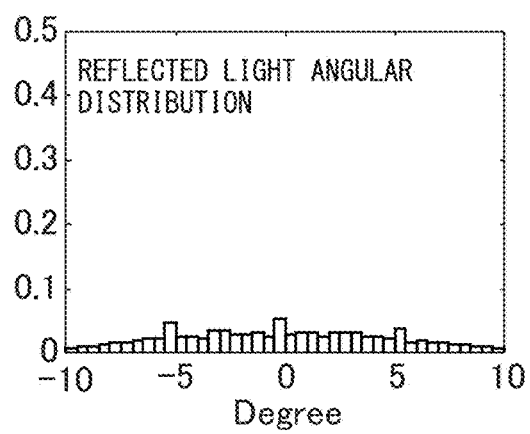
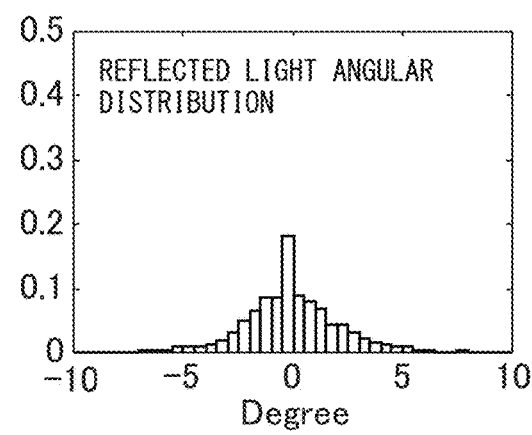
(a) LARGE SURFACE ROUGHNESS
(b) SMALL SURFACE ROUGHNESS CONDITION I: NORMAL DIRECTION CHANGE RATE OF SHAPE LARGE, SURFACE ROUGHNESS SMALL → SHAPE CHANGE RECOGNIZABLE
CONDITION II: NORMAL DIRECTION CHANGE RATE OF SHAPE SMALL, SURFACE ROUGHNESS SMALL → SHAPE CHANGE NOT RECOGNIZABLE
CONDITION III: NORMAL DIRECTION CHANGE RATE OF SHAPE LARGE, SURFACE ROUGHNESS LARGE → SHAPE CHANGE NOT RECOGNIZABLE X: STATE OF DISPLAYED MACHINE SURFACE ACCORDING TO PRESENT INVENTION
I: CHANGE ONLY IN NORMAL DIRECTION CHANGE RATE WITHOUT CHANGE IN SURFACE ROUGHNESS
II: CHANGE IN BOTH SURFACE ROUGHNESS AND NORMAL DIRECTION CHANGE RATE
III: CHANGE ONLY IN SURFACE ROUGHNESS WITHOUT CHANGE IN NORMAL DIRECTION CHANGE RATE

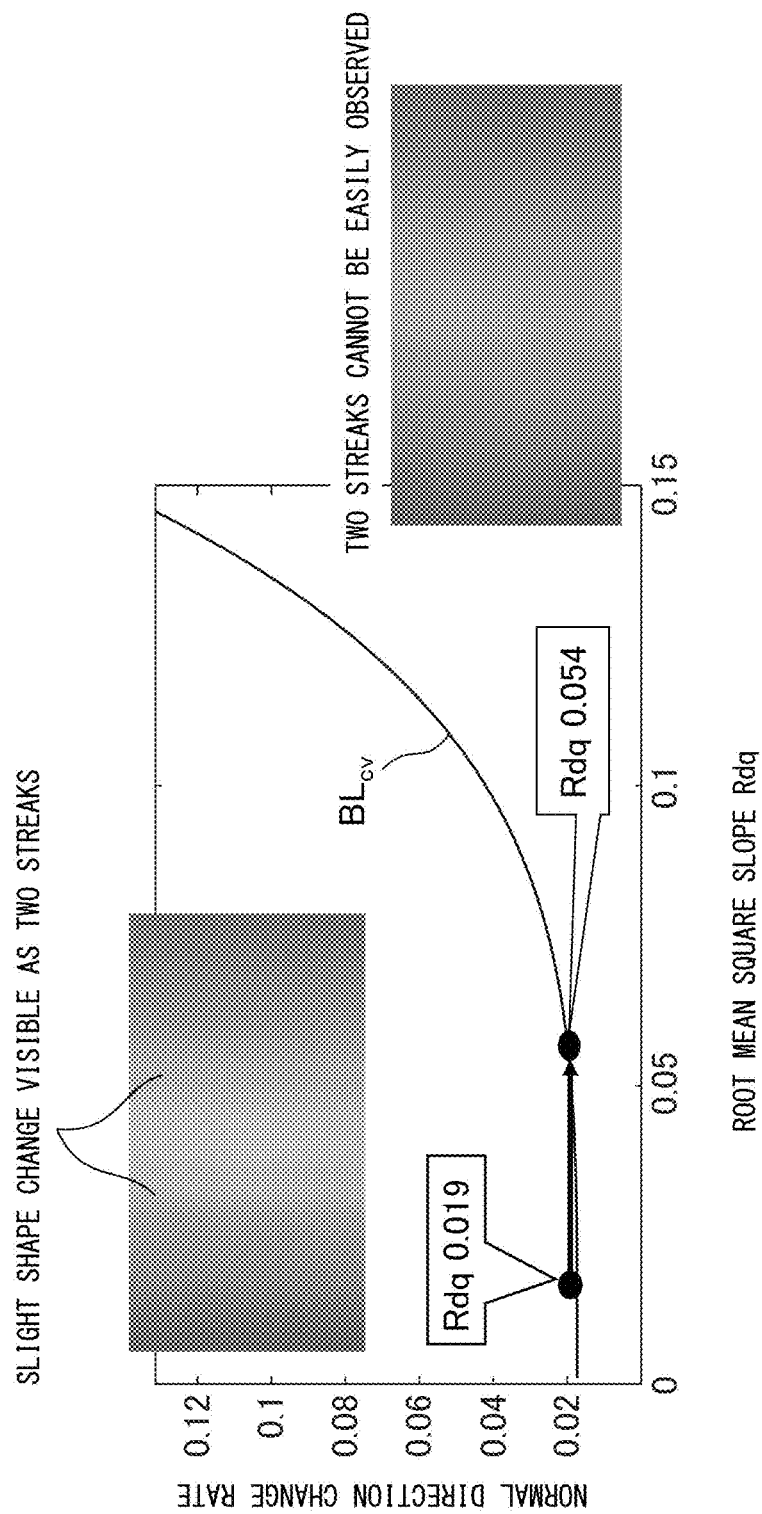

OBJECT SURFACE EVALUATION METHOD, EVALUATION DEVICE, WORKPIECE MACHINING METHOD USING SAID EVALUATION METHOD, AND MACHINE TOOL

This application is a National Stage Application of PCT/JP2018/003850, filed Feb. 5, 2018, which claims benefit of Japanese Patent Application No. 2017-023518, filed Feb. 10, 2017, which applications are incorporated herein by reference. To the extent appropriate, a claim of priority is made to each of the above-disclosed applications.

FIELD

The present invention relates to an object surface evaluation method for evaluating characteristics of the object surface based on the appearance thereof, an evaluation device, and a workpiece machining method and machine tool using the evaluation method.

BACKGROUND

When machining a workpiece with a machine tool, the criteria for evaluation of the machined surface of the workpiece normally include the accuracy of the machined workpiece surface, in particular, surface roughness. Conventionally, the lower the surface roughness of the machined surface, the better the machining. However, recently, the appearance of the machined surface as viewed by an observer has been emphasized along with machining accuracy. For example, even if the surface roughness of the machined workpiece is lower than the allowable surface roughness required by the user, lines and patterns may be visible in undesired portions. Thus, surface evaluation methods based on characteristics which are visible to a person in addition to machining accuracy and surface roughness have been developed.

For example, Patent Literature 1 illustrates changing control device parameters and machining conditions in accordance with the evaluation of a machined surface based on characteristics which are visible to a person. Patent Literature 2 illustrates a method in which a machined surface is evaluated based on the results of quantitative evaluation of characteristics which are visible to a person. Non-Patent Literature 1 illustrates a method in which reflection characteristics of a machined surface are calculated, based on a surface property thereof, and displayed on a computer display. Non-Patent Literature 2 illustrates the influence of surface roughness on the appearance of a machined surface.

CITATION LIST

Patent Literature

[PTL 1] WO 2014/155727
[PTL 2] Japanese Unexamined Patent Publication (Kokai) No. 2016-142720

Non Patent Literature

[NPL 1] R. L. Cook and K. E. Torrance, A Reflectance Model for Computer Graphics, ACM Transactions on Graphics, Vol. 1, No. 1, 1982, pp. 7-24
[NPL 2] Takumi Nakanishi, Ryuta Sato, Keiichi Shirase, Mitsunari Oda, Yasei Nakayama, Machined Surface Evaluation Methods Based on Characteristics Visible to Humans—the Effect of Surface Roughness on the Visibility Limit of Normal Direction Change Rate, 2016 Annual Precision Engineering Conference, 2016, pp. 745-746

SUMMARY

Technical Problem

Though methods for the evaluation of an object surface, in particular, a machined surface, based on characteristics which are visible to a person are being developed, methods for the evaluation of an object surface or a machined surface of a workpiece which further reflects characteristics which are visible to a person are desired. Further, the application of the evaluation of an object surface or machined surface of a workpiece based on characteristics which are visible to a person to actual workpiece machining has become necessary.

The present invention aims to provide a method for the evaluation of an object surface based on characteristics which are visible to a person, an evaluation device, and a workpiece machining method and machine tool using the evaluation method.

Solution to Problem

In order to achieve the object described above, according to the present invention, there is provided an object surface evaluation method for evaluating an object surface, the method comprising the steps of creating a visible area map by setting a parameter representing a surface property of the object surface as a first axis, setting a normal direction change rate of a shape of the object surface as a second axis, and relating a minimum normal direction change rate visible to a person with the parameter representing the surface property of the object surface, and displaying the relationship between the parameter representing the surface property of the object surface and a maximum value of the normal direction change rate of the object surface on the visible area map.

According to the present invention, there is provided an object surface evaluation device for evaluating an object surface, comprising a visible area map storage unit for storing a minimum normal direction change rate visible to a person in association with a parameter representing a surface property of the object surface, a normal direction change rate calculation unit for calculating a normal direction change rate across the entirety of a target evaluation surface based on data related to a shape of the target evaluation surface, a surface roughness parameter calculation unit for calculating a parameter representing the surface roughness across the entirety of the target evaluation surface based on the data related to the shape of the target evaluation surface, and a plotting unit for generating a visible area map representing the minimum normal direction change rate visible by a person stored in the visible area map storage unit by setting the parameter representing the surface property of the object surface as a first axis, and setting the normal direction change rate of the shape of the object surface as a second axis, and for plotting on the visible area map and displaying on a display unit a maximum value of the normal direction change rate and a parameter representing the surface roughness of a part of the object surface presenting the maximum value from calculation results of the normal direction change rate calculation unit and the surface roughness parameter calculation unit.

According to the present invention, there is provided a method for machining a workpiece, comprising the steps of creating a visible area map by setting a parameter representing a surface property of an object surface as a first axis, setting a normal direction change rate of a shape of the object surface as a second axis, and relating a minimum normal direction change rate visible to a person with the parameter representing the surface property of the object surface, displaying the relationship between a parameter representing a surface property of a machined surface of a workpiece and a maximum value of the normal direction change rate of the machined surface of the workpiece on the visible area map, and changing a tool condition, machining condition, or control parameter so as to change one or both of the parameter representing the surface property of the machined surface of the workpiece and the normal direction change rate of the shape of the object surface.

According to the present invention, there is provided a machine tool which includes a feed device having at least three orthogonal axes, and which machines a workpiece by moving a tool mounted on a spindle and the workpiece relative to each other, the machine tool comprising a visible area map storage unit for storing a minimum normal direction change rate visible by a person in association with a parameter representing a surface property of the object surface, a normal direction change rate calculation unit for calculating a normal direction change rate across the entirety of a target evaluation surface based on data related to a shape of the target evaluation surface, a surface roughness parameter calculation unit for calculating a parameter representing the surface roughness across the entirety of the target evaluation surface based on data related to the shape of the target evaluation surface, a plotting unit for generating a visible area map representing the minimum normal direction change rate visible to a person stored in the visible area map storage unit by setting the parameter representing the surface property of the object surface as a first axis, and setting the normal direction change rate of the shape of the object surface as a second axis, and plotting on the visible area map and displaying on a display unit a maximum value of the normal direction change rate and a parameter representing the surface roughness of a part of a machined surface of the workpiece presenting the maximum value from calculation results of the normal direction change rate calculation unit and the surface roughness parameter calculation unit, and a parameter change unit for changing a tool condition, a machining condition, or a control parameter so as to change one or both of a parameter representing a surface property of the machined surface of the workpiece and the normal direction change rage of the shape of the object surface.

Advantageous Effects of Invention

According to the present invention, a method for the evaluation of an object surface based on characteristics which are visible to a person, an evaluation device, and a workpiece machining method and machine tool using the evaluation method can be provided. Furthermore, according to the present invention, not only is it possible to make portions of the object surface machined by a machine which would otherwise be visible to a person not easily visibly detectable by a person, but also if a simulator is used, prior to machining by the machine tool, tool conditions, machining conditions, and control parameters for obtaining a desired object surface can be discovered, the effect of which is significant.

BRIEF DESCRIPTION OF DRAWINGS

FIG. 6 is a view showing the relationship between surface roughness and reflected light angular distribution.

FIG. 15 is a view showing an example in which a shape change becomes difficult to detect by changing surface roughness according to the method of the present invention.

DESCRIPTION OF EMBODIMENTS

Preferred embodiments of the present invention will be described below with reference to the attached drawings.

Figure 1:
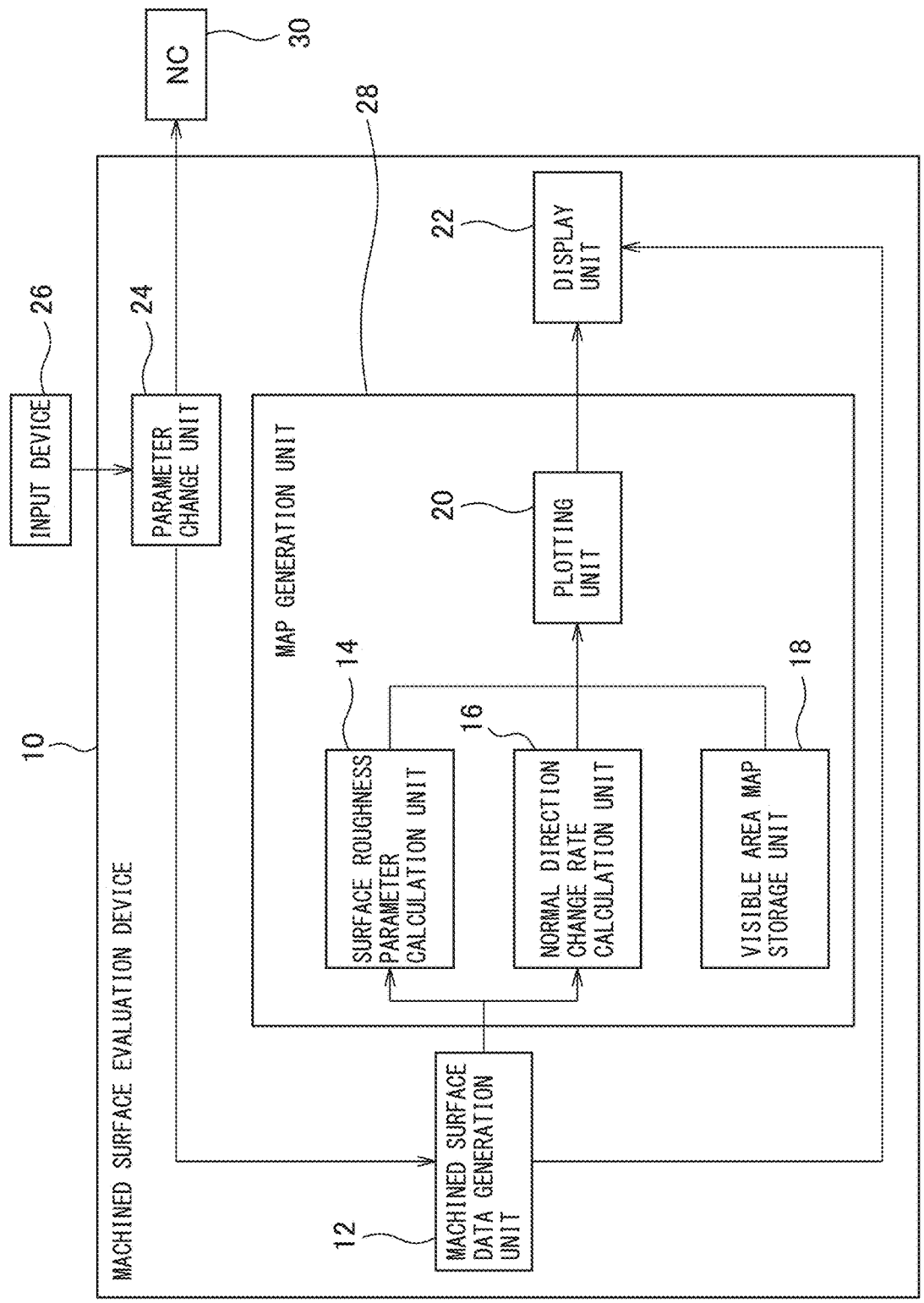
FIG. 1 is a block diagram of an object surface evaluation device according to a preferred embodiment of the present invention.

With reference to FIG. 1, a machined surface evaluation device 10, as the object surface evaluation device of the present invention, comprises, as primary constituent elements, a machined surface data generation unit 12, a map generation unit 28 including a surface roughness parameter calculation unit 14, a normal direction change rate calculation unit 16, a visible area map storage unit 18, a plotting unit 20, and a display unit 22. The map generation unit 28 is composed of a CPU, RAM, ROM, a hard disk drive, an SSD, bidirectional busses for connecting these components, and programs related thereto. The display unit 22 can be composed of a liquid crystal panel or a touch panel.

The machined surface evaluation device 10 can further comprise a parameter change unit 24 and an input device 26. The input device 26 can be, for example, a keyboard, a mouse, or can be the touch panel constituting the display unit 22. The parameter change unit 24 issues commands for changing parameters to the machined surface data generation unit 12 or the NC device 30 of the machine tool in accordance with commands input by the operator via the input device 26. Parameters for which change commands are issued to the machined surface data generation unit 12 include tool conditions such as tool type, tool diameter, and optimal cutting speed, and machining conditions such as pick feed amount, feed speed, and spindle rotation speed. Parameters for which change commands are issued to the NC device 30 include control parameters such as acceleration/deceleration time constants, backlash correction, and gain in feed shaft feedback control.

The machined surface data generation unit 12 generates data related to the shape of the machined surface of the workpiece after machining, and data related to the properties of the machined surface. The data related to the machined shape and the data related to the properties of the machined surface can be calculated by a calculation device such as a simulator based on a machining program from the CAM. Alternatively, a workpiece may be actually machined by a machine tool in accordance with the machining program, and data obtained by measuring the machined surface may be used as the data related to the machined shape and properties of the machined surface.

The surface roughness parameter calculation unit 14 calculates the property parameter of the machined surface (object surface), in particular, the surface roughness parameter of the machined surface (object surface), based on the data related to the properties of the machined surface (object surface) from the machined surface data generation unit 12. The root mean square slope $R_{dq}$ prescribed in, for example, JIS B0601, can be used as the surface roughness parameter.

Figure 2:
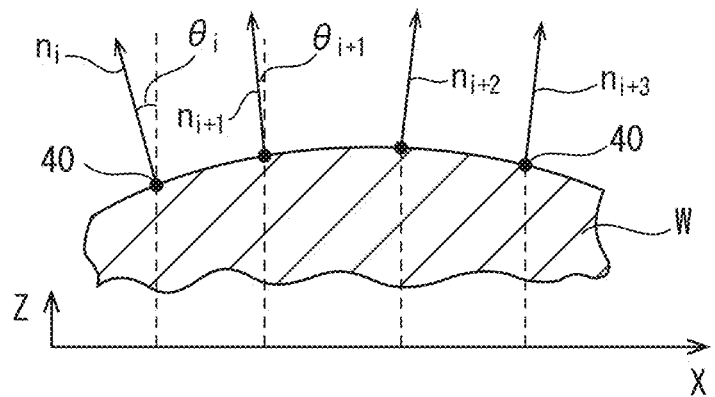
FIG. 2 is an explanatory diagram of a method for determining a normal direction change rate.

The normal direction change rate calculation unit 16 calculates the normal direction change rate of the machined surface (object surface) based on the machined surface (object surface) data from the machined surface data generation unit 12. The normal direction change rate will be described with reference to FIGS. 2 and 3. The machined surface (object surface) data from the machined surface data generation unit 12 includes two-dimensional coordinate values. In the example shown in FIG. 2, the workpiece W, which is the evaluation target, has been cut along a plane parallel to the X-axis and the Z-axis. Normal vectors can be set at predetermined intervals along the surface of the workpiece W. The workpiece W is cut at predetermined intervals along the plane parallel to the X-axis and the Z-axis. By setting normal vectors at predetermined intervals along each cut plane, it is possible to evaluate the entire surface of the workpiece W.

Set points 40 are set at predetermined intervals on the machined surface (object surface) of the workpiece W. Next, normal vectors $n_i$ are set perpendicular to the slope of the surface at the set points 40. The normal vector $n_i$ is the normal vector of the $i^{th}$ set point 40. The angle $\theta_i$ of the normal direction is set for the normal vector $n_i$. The angle with respect to the Z-axis is set as the angle $\theta_i$ of the normal direction.

Figure 3:
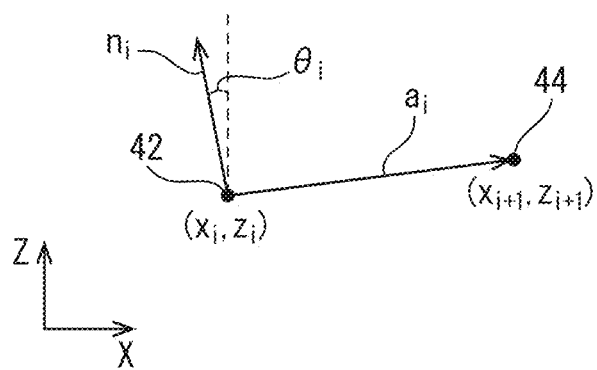
FIG. 3 is an explanatory diagram of a method for determining the angle of a normal direction from coordinate information.

In FIG. 3, the coordinate values of the $i^{th}$ set point 42 and the $(i+1)^{th}$ set point 44 are known. Vector $a_i$ can be set based on the coordinate values of these two set points 42, 44. The vector $a_i$ is the vector from set point 42 toward set point 44. The vector orthogonal to the vector ai can be set as the normal vector $n_i$. The angle $\theta_i$ of the normal direction at this time can be calculated by the following formula (1). Thus, the angle $\theta_i$ of the normal direction can be calculated for the $i^{th}$ set point of the machined surface (object surface).

[Formula 1]

$$\theta_i = \tan^{-1}\frac{(z_{i+1} - z_i)}{(x_{i+1} - x_i)} \quad (1)$$

$\theta_i$ is the angle of the normal direction the $i^{th}$ set point

The normal direction change rate calculation unit 16 calculates the normal direction change rate at the set point 40. The normal direction change rate is the change rate of the angle of the normal direction of mutually adjacent set points. An example thereof is the change rate of the angle $\theta_i$ of the normal direction and the angle $\theta_{i+1}$ of the normal direction. The normal direction change rate can be calculated by the following formula (2). The following formula (2) represents the normal direction change rate of the $i^{th}$ set point 40 of the design shape. The normal direction change rate of the evaluation target shape can be calculated by the same method. Note that, it is geometrically clear that the change rate in the normal direction is the same as the change rate in the tangential direction of the machined surface.

[Formula 2]

$$\frac{d\theta_i}{dx} = \left(\frac{\theta_{(i+1)} - \theta_i}{x_{(i+1)} - x_i}\right) \quad (2)$$

$d\theta_i/dx$ is the normal direction change rate.

The visible area map storage unit 18 stores the range of normal direction change rate in which the shape change of the machined surface (object surface) is visually recognizable in the form of a two-dimensional map (visible area map) in a relationship with the surface roughness parameter. The visible area map will be described.

Figure 4:
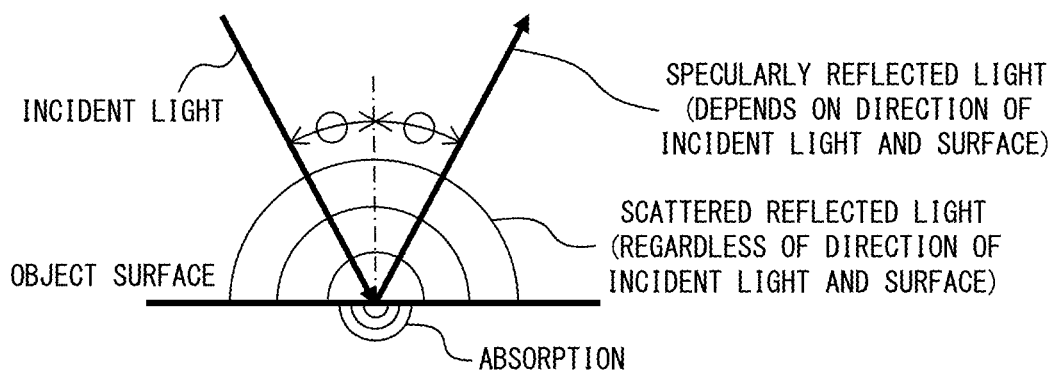
FIG. 4 is a schematic diagram showing a state in which light is incident on an object surface.

A person recognizes the shape or texture of an object by sensing the intensity (luminance) of light reflected by the object surface. FIG. 4 schematically shows a state in which light is incident on an object surface. The light incident on the object is partially absorbed due to the properties of the molecules of the material constituting the object. Further, reflected scattered light, which propagates uniformly in all directions regardless of the macro direction of the object surface, is produced by fine shape changes of the object surface which are shorter than the wavelength of light and the characteristics of the molecules of the material. The light specularly reflected due to shape changes of the object surface which are longer than the wavelength of the light is determined by the relationship between the incident light and the direction of the object surface.

The sum of the scattered light, the specularly reflected light, and the absorbed light cannot be greater than the total amount of incident light. In other words, when all of the light is reflected as scattered light, the reflected light is transmitted in all directions regardless of the direction or shape of the object surface, whereby the direction or shape of the object surface cannot be visually recognized. Conversely, if the component reflected as the scattered light is small and the amount of the specularly reflected component is large, it becomes easy to visually recognize the direction and shape of the object surface.

Figure 5:
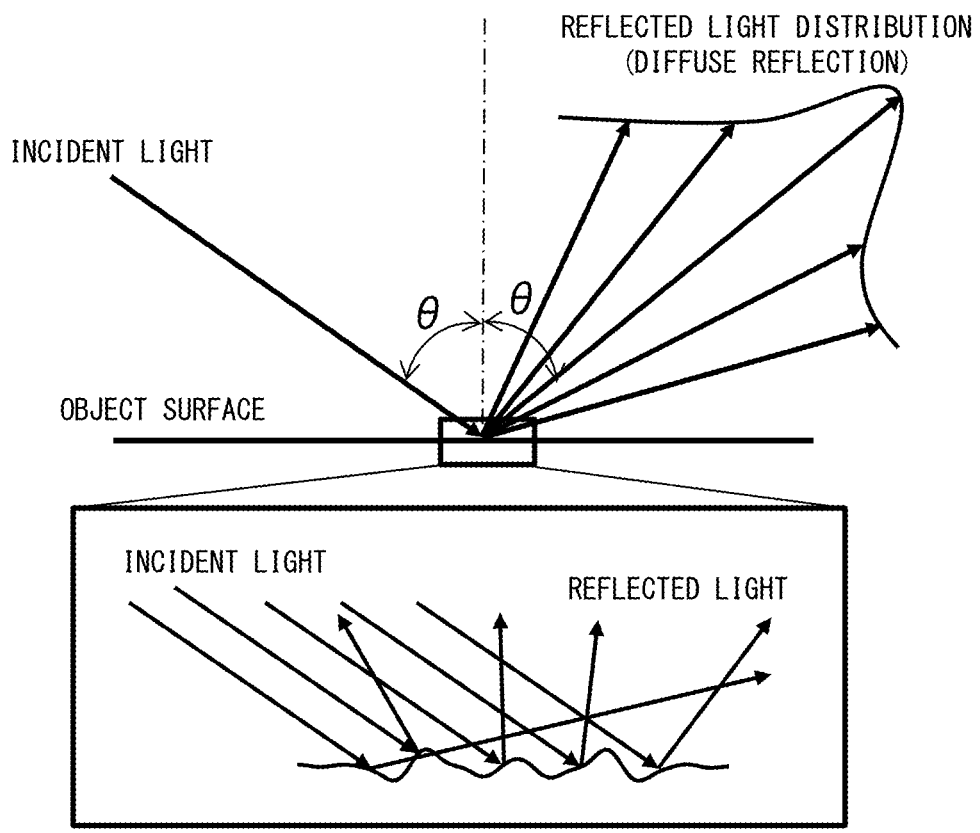
FIG. 5 is a schematic diagram showing diffuse reflection due to surface roughness.

For example, in a surface which has been mechanically finished by cutting or the like, in many cases, the amplitude and/or wavelength of the surface roughness curve is larger than the wavelength of light. In such a case, light incident on the object surface is irregularly reflected by the unevenness of the surface. Such a case is schematically shown in FIG. 5. Even when light is incident from a predetermined direction, as the direction of the object surface changes, the direction of the reflected light changes in various ways, and the light is reflected with an angular distribution with respect to the direction of the reflected light when perfect planar light is incident. Even in such a case, the shape change of the object surface appears blurry, as in the case of a large proportion of scattered light.

The angular distribution of reflected light can be geometrically calculated from the roughness curve of the object surface. An example in which a reflected light angular distribution is calculated from measurement of the roughness curve of a metal surface which has been finished by cutting is shown in FIG. 6. When the surface roughness is large, the reflected light angular distribution is wide, whereby shape change of the machined surface (object surface) is not easily recognizable. When the surface roughness is small, the reflected light angular distribution is narrow, whereby shape change of the machined surface (object surface) is easily recognizable.

The relationship between the magnitude of the wavelength of a shape change and the visual recognition thereof can be roughly classified as follows, assuming observation by the naked eye of a person.

Wavelengths on the order of hundreds of nm or less→scattered light;

wavelengths on the order of hundreds of nm to hundreds of μm→diffuse light; and wavelengths on the order of hundreds of μm or more→shape change.

In the present invention, shape change means an intentional or locally generated step or shape error, and surface roughness means a periodic unevenness of several hundred μm or less in wavelength extending across the entirety or a certain range of an object surface.

Figure 7:
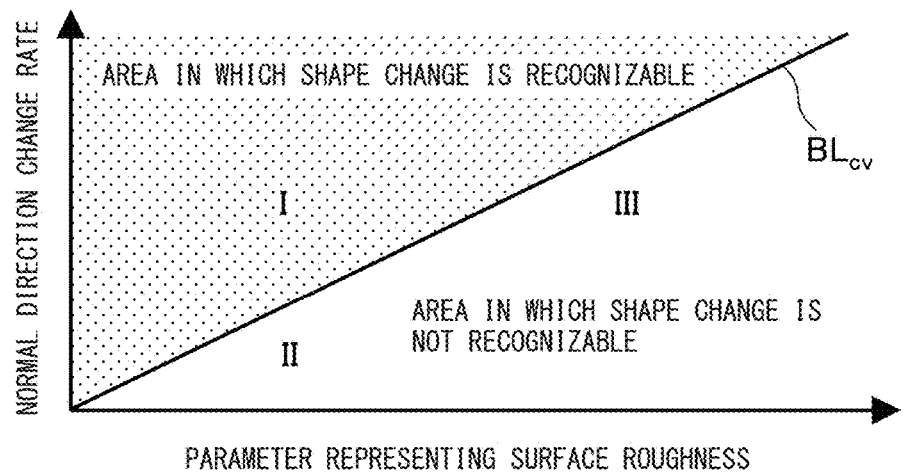
FIG. 7 is a view showing an example of a visible area map according to the present invention.

A visible area map representing the state of the object surface according to the present invention is schematically shown in FIG. 7.

Figure 8:
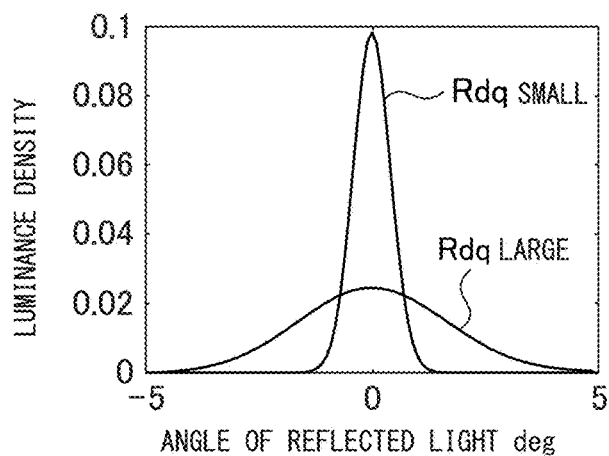
FIG. 8 is a view showing an example of calculation results of the probability density distribution of reflected light in accordance with the Beckmann distribution.

In the visible area map of the present invention, the first axis or the horizontal axis represents the parameter representing surface roughness, and the second axis or the vertical axis represents the normal direction change rate of the shape. The first and second axes may be interchanged, and the vertical axis may represent the parameter representing surface roughness and the horizontal axis may represent the normal direction change rate. As described in Patent Literature 2, changes in the normal direction of the shape can be visually recognized by a person as changes in luminance. If the surface roughness is large, as shown in FIG. 8, the diffuse reflection component of the reflected light is large. Even when an identical normal direction change is present, the change in luminance is small, whereby the shape becomes difficult to recognize. In other words, even when there are identical shape changes, there are cases in which the shape change can be visually recognized and cases in which the shape change cannot be visually recognized depending on differences in surface properties.

In FIG. 7, conditions I represents the case in which the normal direction change rate of the shape is large and the surface roughness is small. In this case, the shape change can be visually recognized. Conditions II represents the case in which the surface roughness is the same as in the case of conditions I, and the normal direction change rate is small. In this case, the shape change cannot be visually recognized. Conditions III represents the case in which the normal direction change rate is the same as the case of conditions I, and the surface roughness is large. In this case, the shape change cannot be visually recognized. Though visual recognizability varies from person to person, the boundary line $BL_{cv}$ can be set between the roughly recognizable area and the unrecognizable area.

An example of the method for determining the boundary line $BL_{cv}$ will be described below.

The relationship between the surface roughness of a machined surface (object surface) and the reflected angular distribution of the reflected light can be represented by a "Beckmann distribution (formula (3))" as described in Non-Patent Literature 1.

[Formula 3]

$$D(m, \alpha) = \frac{1}{m^2(\cos\alpha)^4} \exp-\left(\frac{\tan\alpha}{m}\right)^2 \quad (3)$$

D represents the reflected light intensity in accordance with angle, α represents the direction of the machined surface (object surface), and m is the parameter representing the surface roughness of the machined surface (object surface). For example, the root mean square slope $R_{dq}$ determined in accordance with JIS B0601 can be used as m.

FIG. 8 shows an example in which the intensity of reflected light in accordance with the angle of reflection is calculated based on formula (3) when light is incident perpendicular to the direction α of the machined surface (object surface). As shown in FIG. 8, when the root mean square slope $R_{dq}$, which is the parameter representing surface roughness, is large, the width of the angular distribution of the reflected light is wide, whereby the shape change of the machined surface (object surface) becomes difficult to visually recognize.

The change rate of the direction α of the machined surface (object surface) depending on position in formula (3) is equivalent to the normal direction change rate of the machined surface (object surface). As a result, the change rate of the reflection intensity D is equivalent to the change rate of the luminance of the machined surface (object surface) recognized by a person. From formula (3), the relationship between the normal direction change rate of the shape and the change rate of the luminance L of the reflected light can be derived as follows.

[Formula 4]

$$\frac{d\alpha}{dx} = \frac{m^2(\cos\alpha)^6}{2\tan\alpha\{2m^2(\cos\alpha)^2 - 1\}} \exp\left(\frac{\tan\alpha}{m}\right)^2 \frac{\partial L}{\partial x} \quad (4)$$

When the change rate of the luminance of the reflected light is constant, and formula (4) is rearranged as the relationship between the parameter m representing the surface roughness and the normal direction change rate of the shape of the machined surface (object surface), formula (5) is obtained. Formula 5 represents the normal direction change rate necessary for a constant luminance change rate to occur when the horizontal axis is the parameter m representing the surface roughness.

[Formula 5]

$$\frac{d\alpha}{dx} = \left| \frac{m^2 \cos(A(\pi/180))^6}{2\tan(A(\pi/180))\{2m^2(\cos A(\pi/180))^2 - 1\}} \exp\left(\frac{\tan(A(\pi/180))}{m}\right)^2 \right| + B \quad (5)$$

In formula (5), A and B are constants determined in accordance with the material of the evaluation target object (workpiece) and the state of the incident light. For example, A and B can be determined by creating workpieces for evaluation as shown in Patent Document 2 or Non-Patent Document 2, and determining the relationship between the normal direction change rate and the luminance change rate from the photographic results. When the normal direction change rate and luminance change rate at this time are used as the normal direction change rate and luminance change rate visible by a person to determine constants A and B of formula (5), the curve represented by formula (5) is the minimum normal direction change rate visible to a person, which represents the boundary at which a shape change can or cannot be visually recognized by a person. This normal direction change rate is obtained by extracting only spatial frequency components which are visually recognizable by a person from the geometrical normal direction change rate of the shape of the machined surface (object surface) defined by formula (2). Note that the range of spatial frequency components which are visually recognizable by a person may be determined based on an ophthalmologic contrast sensitivity curve or may be determined using a shape separately prepared for evaluation.

Figure 9:
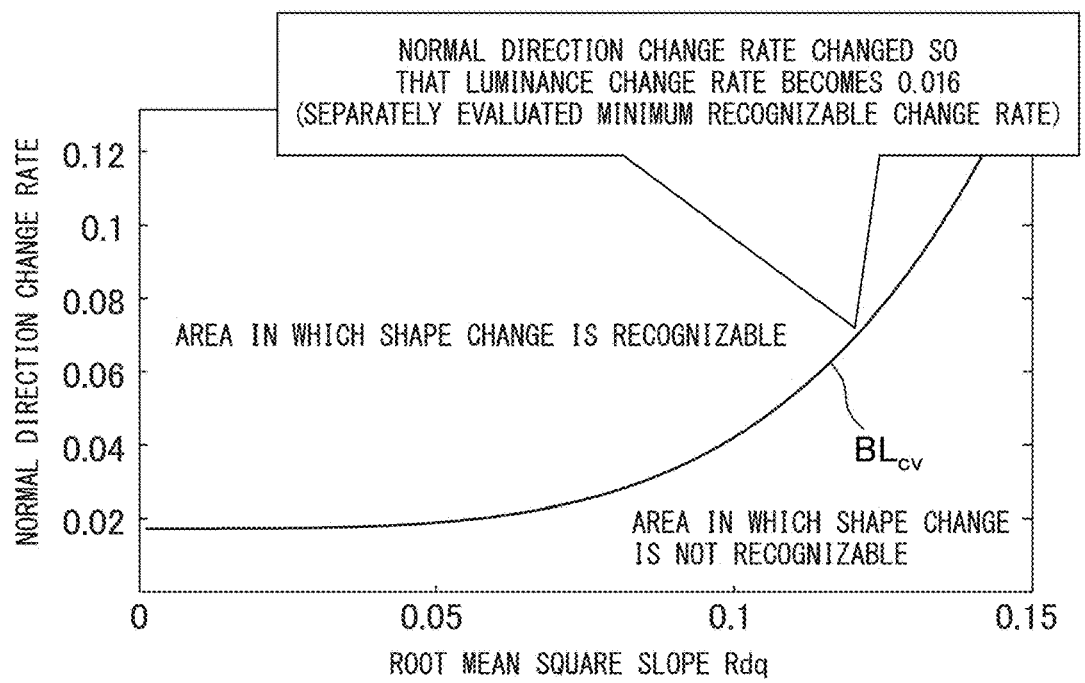
FIG. 9 is a view showing another example of a visible area map representing the relationship between surface roughness and visible normal direction change rate.

FIG. 9 shows an example of a visible area map for evaluating a machined surface (object surface) created by the method described above. In FIG. 9, the boundary line $BL_{cv}$ is the curve according to formula (5), and the area above this boundary line $BL_{cv}$ is the area in which shape change is visible. As shown in FIG. 9, when the root mean square slope $R_{dq}$ of the machined surface (object surface), as the parameter representing surface roughness, is large, the area in which the shape change is visible narrows exponentially.

Though the visible area map can be analytically determined in this manner, as shown in FIG. 9, the visible area map may empirically be created using an evaluation workpiece as shown in Patent Literature 2 and Non-Patent Literature 2. The visible area map storage unit 18 stores data enabling the display unit 22 to display the visible area map as shown in FIG. 7 and FIG. 9.

The plotting unit 20 plots the maximum value of the normal direction change rate and the parameter representing the surface roughness of portions of the machined surface (object surface) of the workpiece imparting the maximum value on a visible area map based on calculation results of the surface roughness parameter calculation unit 14 and the normal direction change rate calculation unit 16, and data related to the visible area map received from the visible area map storage unit 18, and displays the same on the display unit 22. As a result, it can be explicitly shown whether the shape change is visually recognizable.

The operator of the CAM or the operator of the machine tool for machining the workpiece using the machining program created by the CAM can determine whether or not the shape change of the machined surface (object surface) of the workpiece is visually recognizable by referring to the visible area map displayed on the display unit 22. For example, when visual recognition of the shape change of the machined surface (object surface) is not desired, or conversely when visual recognition is desired, by changing the tool conditions, machining conditions, or control parameters via the input device 26 and parameter change unit 24, the relationship between the parameter representing the surface roughness of the machined surface (object surface) and the normal direction change rate can be shifted to the area in which the shape change can be recognized or the area in which the shape change cannot be recognized on the visible area map of FIGS. 7 and 9 of the present invention.

Figure 10:
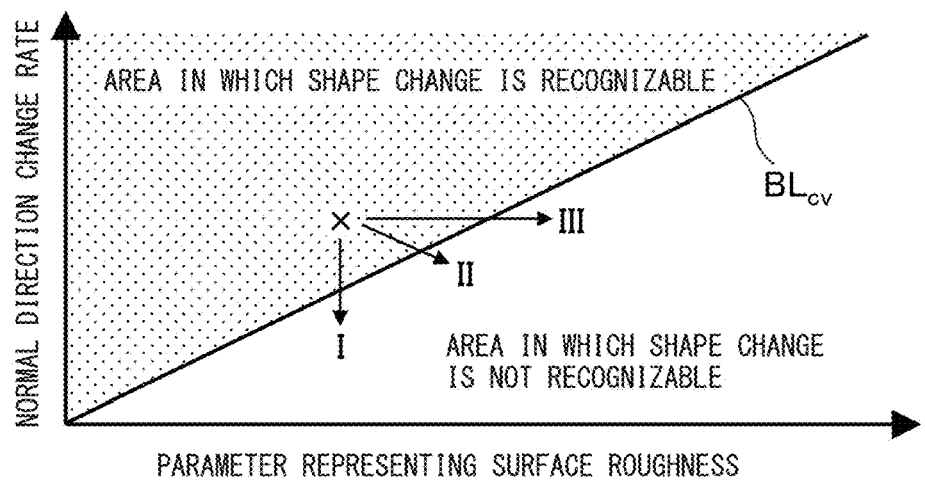
FIG. 10 is an explanatory diagram of a method for making a visible shape change non-visible according to the present invention.

In the case in which visual recognition of shape change is not desired, when the points plotted on the visible area map by the plotting unit 20 are within the visible area, i.e., when the points are above the boundary line $BL_{cv}$, by changing one or both of the normal direction change rate and the parameter representing surface roughness, as shown in FIG. 10, the points representing the state of the machined surface (object surface) can be shifted outside the visible area, whereby it is possible to make the shape change become visually unrecognizable.

Figure 11:
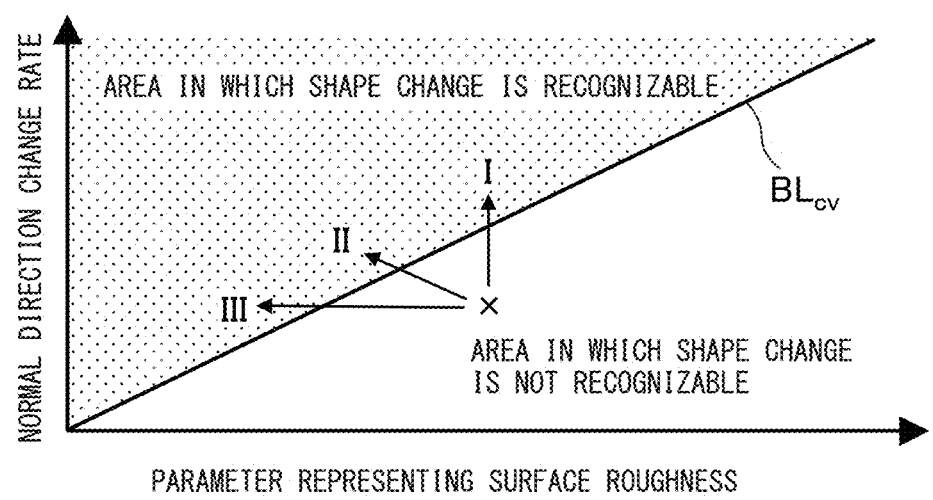
FIG. 11 is an explanatory diagram of a method for making a non-visible shape change visible according to the present invention.

Conversely, in the case in which visual recognition of shape change is desired, when the plotted points are outside of the visible area, by changing one or both of the normal direction change rate and the parameter representing surface roughness, as shown in FIG. 11, the points representing the state of the machined surface (object surface) can be shifted outside the visible area, whereby it is possible to make the shape change become visually recognizable. The determination of whether to change one or both of the normal direction change rate and the parameters representing surface roughness can be selected in accordance with the shape accuracy and surface roughness required for the machined surface (object surface).

Next, an application example of a machined surface (object surface) evaluation device 10 according to the present invention will be described with reference to FIG. 12. In the example shown in FIG. 12, the machined surface data generation unit 12 is constituted by the simulator 70.

Figure 12:
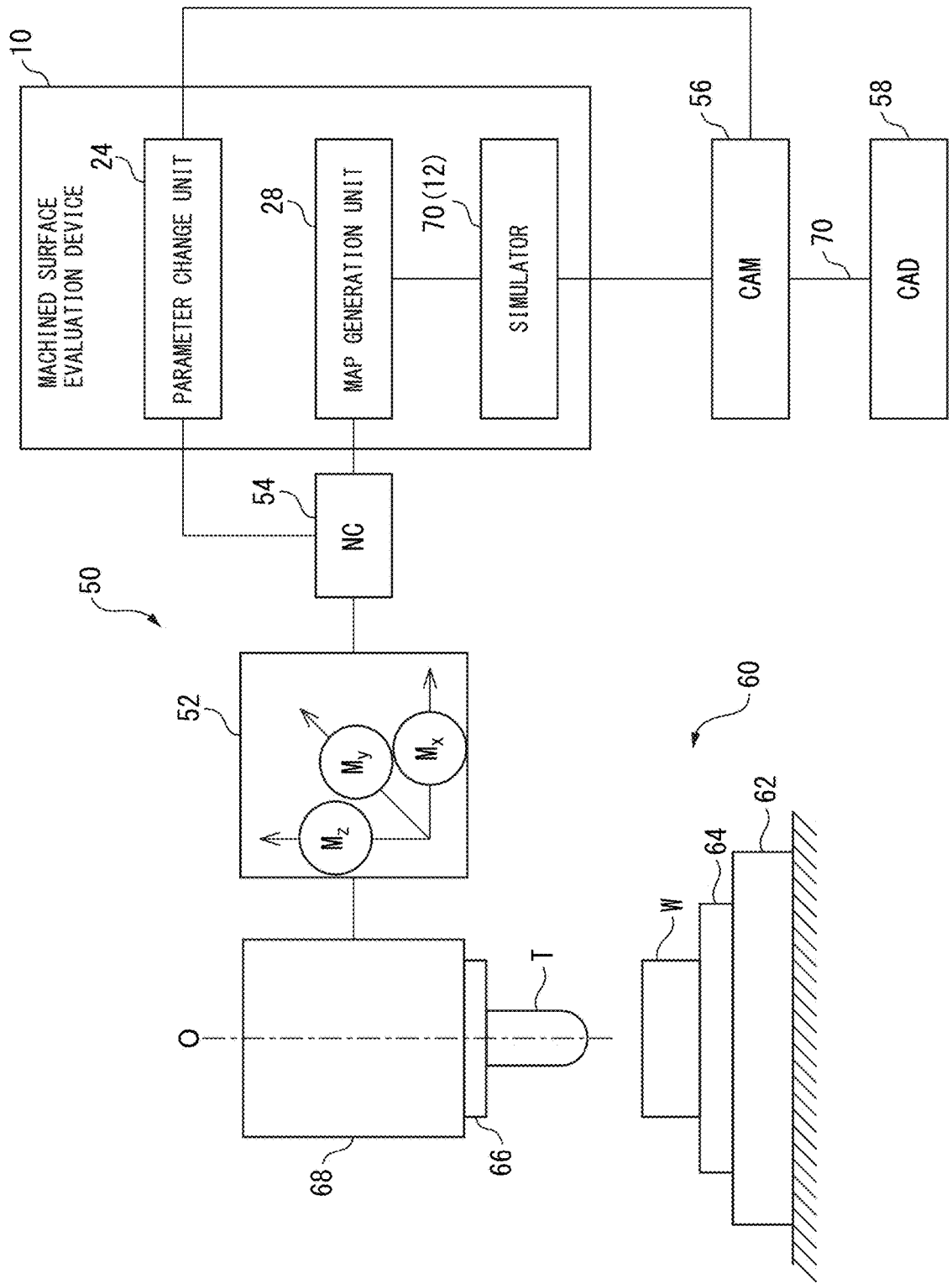
FIG. 12 is a block diagram showing an application example of a machined surface evaluation device according to the present invention.

In the machine tool 50 of FIG. 12, the machined surface (object surface) evaluation device 10 is combined with the machining device 60. The machining device 60 comprises, as primary constituent elements, a bed 62 as a base secured to the floor of a factory, a table 64 which is attached to the upper surface of the bed 62 and on an upper surface of which the workpiece W is secured, a spindle head 68 which supports a spindle 66, on a tip of which a tool T facing the workpiece W secured to the bed 62 is mounted, so as to be rotatable around a vertical axis of rotation O, a drive mechanism 52 for reciprocally driving the spindle head 68 in the X-axis, Y-axis, and Z-axis orthogonal directions relative to the bed 62, and an NC device 54 for controlling the servomotors of the drive mechanism 52.

The drive mechanism 52 comprises, for example, X-axis, Y-axis, and Z-axis ball screws (not illustrated), nuts (not illustrated) for engagement with the ball screws, X-axis, Y-axis, and Z-axis drive motors Mx, My, and Mz consisting of servomotors connected to one end of each of the X-axis, Y-axis, and Z-axis ball screws for rotationally driving the X-axis, Y-axis, and Z-axis ball screws. Furthermore, in addition to the three orthogonal feed axes of the X-axis, Y-axis, and Z-axis, the machine tool 50 may include one or more rotational feed shafts such as an A-axis feed shaft for rotation about the X-axis in the horizontal direction, or a C-axis feed shaft for rotation about the Z-axis in vertical direction. In such a case, in addition to the X-axis, Y-axis, and Z-axis drive motors Mx, My, and Mz, the drive mechanism 52 may include servomotors for the rotational feed shafts such as the A-axis and C-axis feed shafts.

The machining program generated by the CAM device 56, which is connected to the CAD device 58 via a computer network such as a LAN, is supplied to the simulator 70. The machining program includes a tool path calculated based on workpiece W shape data generated by the CAD device 58, tool conditions such as tool type, tool diameter, and optimum cutting speed, and machining conditions such as pick feed amount, feed speed, and spindle rotation speed.

Next, another application example of a machined surface (object surface) evaluation device 10 according to the present invention will be described in reference to FIG. 13. In the example shown in FIG. 13, the machined surface data generation unit 12 is constituted by a measurement device 80. Additionally, in the example of FIG. 13, the machined surface (object surface) evaluation device 10 is combined with the machining device 60. The measurement device 80 can be, for example, a measurement probe attached to the tip of the spindle 66. In this case, the shape or surface roughness of the machined surface can be measured from the coordinate values of each of the feed shafts based on a skip signal transmitted to the NC device 54 from the measurement probe when the measurement probe contacts the machined surface of the workpiece W.

Figure 13:
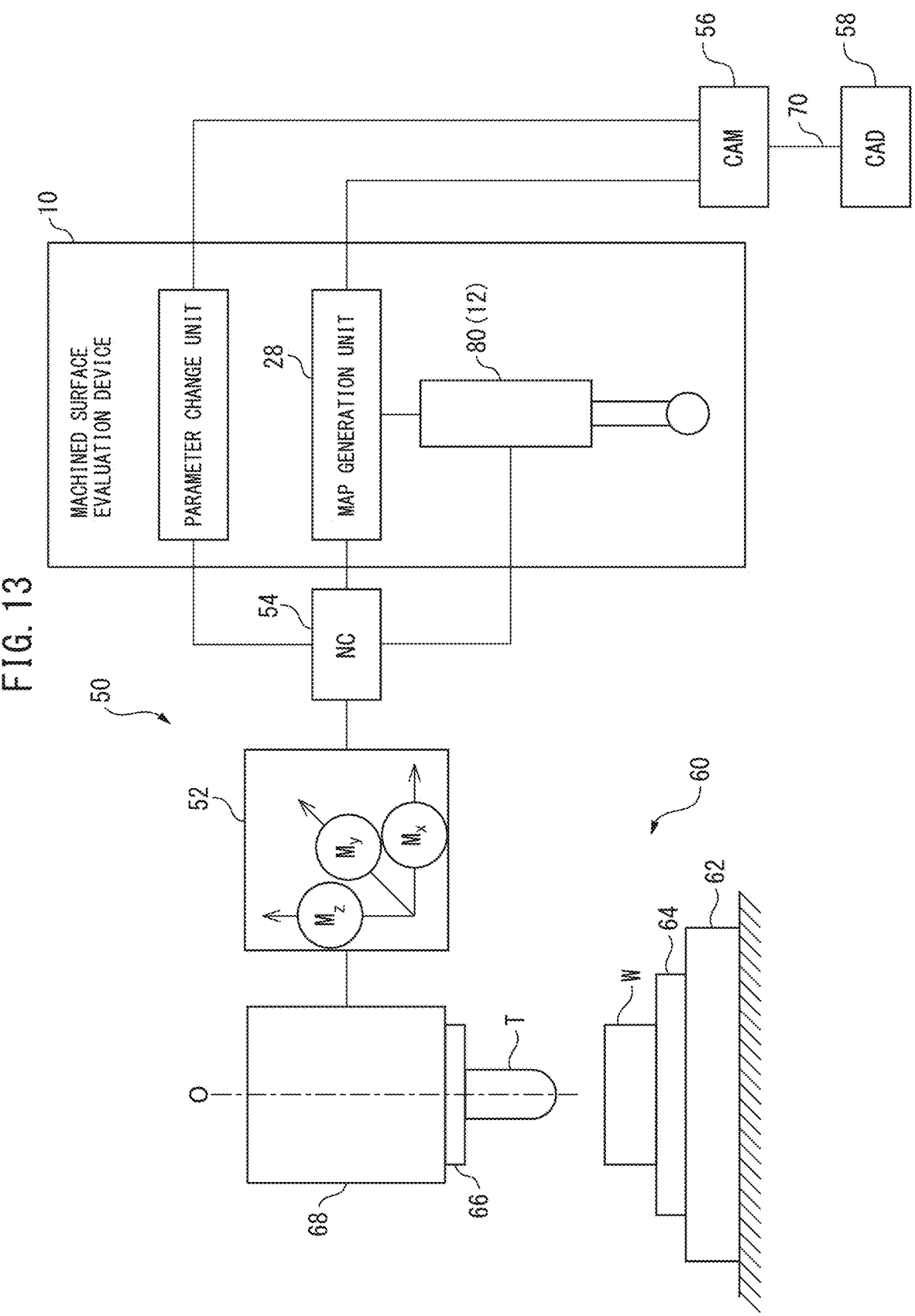
FIG. 13 is a block diagram showing another application example of a machined surface evaluation device according to the present invention.

In the structures of FIGS. 12 and 13, the machined surface evaluation device 10 can be incorporated as a part of the control program of the machine controller (not illustrated) of the machining device 60 or the NC device 54. In this case, the display unit 22 and the input device 26 can be constituted by a touch panel (not illustrated) provided on a control panel (not illustrated) of the machining device 60. Alternatively, the machined surface evaluation device 10 may be integrated as a part of the CAM device 56. In this case, the display unit 22 can be constituted by the monitor (not illustrated) of the CAM device 56 and the input device 26 can be constituted by the keyboard (not illustrated) and mouse (not illustrated) of the CAM device 56.

Figure 14:
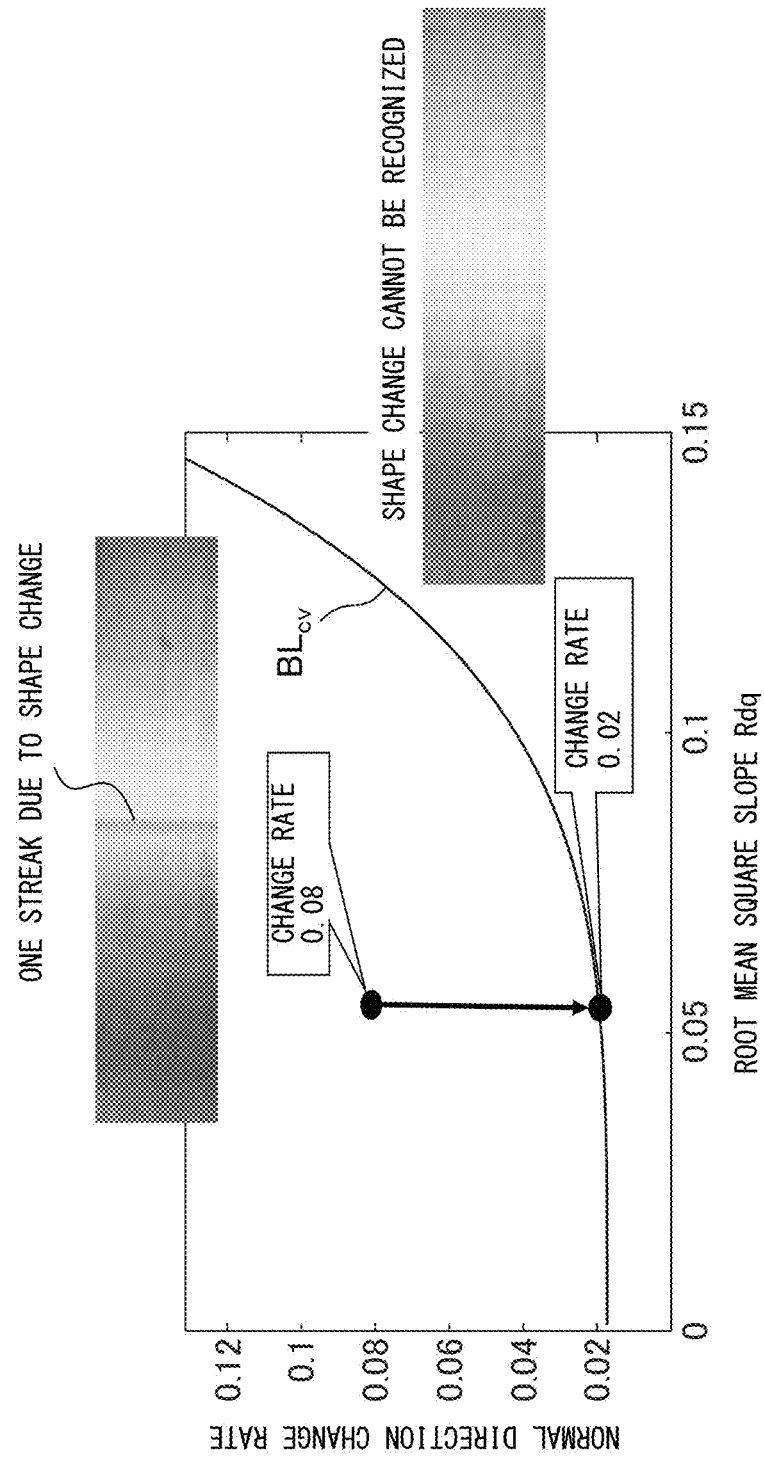
FIG. 14 is a view showing an example in which a shape change becomes difficult to detect by changing a normal direction change rate according to the method of the present invention.

Next, FIG. 14 shows an example in which the method according to the present invention is applied to a machined surface of a workpiece produced by actually performing cutting using a numerically controlled machine tool such as the machine tool 50. FIG. 14 also shows the photographic results of machined surfaces under constant conditions.

In the case in which the maximum value of the normal direction change rate was 0.08, according to the evaluation method of the present invention, such a state is a state in which shape change is visible, and streak-like patterns due to shape change were actually observed on the machined surface of the workpiece. According to the present invention, when the normal direction change rate is 0.02 or less, shape change cannot be observed. By adjusting the control parameters of the numerically controlled machine tool to make the actual normal direction change rate 0.02, streaking on the machined surface could not be visually recognized.

FIG. 15 shows another example in which the method according to the present invention is applied to a machined surface of a workpiece produced by actually cutting with a numerically controlled machine tool. FIG. 15 also shows the photographic results of machined surfaces under constant conditions.

In the case in which the root mean square slope of the machined surface was 0.019, according to the evaluation method of the present invention, in such a state, shape change is visible, and streak-like patterns due to shape change were actually observed on the machined surface of the workpiece. According to the present invention, when the root mean square slope of the machined surface is about 0.05 or more, shape change cannot be observed. By changing the diameter of the tool used for the machining to make the actual root mean square slope about 0.05 or more, streaking of the machined surface became only slightly visible.

Furthermore, though the present embodiment has been described using the normal direction change rate of the shape of the object surface, the present invention is not limited thereto. For example, equivalents of the normal direction change rate such as the tangential change rate of the object surface or the derivative value of the object surface shape are encompassed by the present invention.

REFERENCE SIGNS LIST

10 Machined Surface (Object Surface) Evaluation Device
12 Machined Surface Data Generation Unit
14 Parameter Calculation Unit
16 Normal Direction Change Rate Calculation Unit
18 Visible Area Map Storage Unit
20 Plotting Unit
22 Display Unit
24 Parameter Change Unit
26 Input Device
28 Map Generation Unit
30 NC Device
40 Set Point
42 Set Point
44 Set Point
50 Machine Tool
52 Drive Mechanism
54 NC Device
56 CAM Device
58 CAD Device
60 Machining Device
62 Bed
64 Table
66 Spindle
68 Spindle Head
70 Simulator
80 Measurement Device

The invention claimed is:

1. A method for evaluating a machined surface of a workpiece, characterized by the steps of:
    creating a visible area map by setting a parameter representing a surface roughness of the machined surface of the workpiece as a first axis, and setting a normal direction change rate as a second axis, the visible area map representing a boundary line between a visually recognizable area and a visually unrecognizable area defined by a stored minimum value of the normal direction change rate visible to a person corresponding to the parameter representing the surface roughness of the machined surface of the workpiece;
    setting a plurality of set points at predetermined intervals on the machined surface of the workpiece;
    calculating a shape of the machined surface of the workpiece by a simulator based on a machining program;
    calculating the normal direction change rate for each of the set points along a plane parallel to horizontal axis and a vertical axis, where the normal direction change rate is a change rate that is calculated at a first set point of the set points that is mutually adjacent to a second set point of the set points by dividing a difference between a second angle of normal direction of the mutually adjacent second set point with respect to the vertical axis and a first angle of normal direction of the first set point with respect to the vertical axis by distance determined along the horizontal axis between a second coordinate point of the horizontal axis of the mutually adjacent second set point and a first coordinate point of the horizontal axis of the first set point;

calculating the parameter representing the surface roughness of the machined surface of the workpiece by the simulator based on the machining program;

displaying relationship between the parameter representing the surface roughness of the machined surface of the workpiece and a corresponding maximum value of the normal direction change rate on the visible area map along with the boundary line based on the calculated parameter representing the surface roughness of the machined surface of the workpiece and the calculated normal direction change rate; and changing a tool condition, a machining condition, or a control parameter so as to change one or both of the parameter representing the surface roughness of the machined surface of the workpiece and the normal direction change rate.

2. The method according to claim 1, wherein the parameter representing the surface roughness of the machined surface of the workpiece is a root mean square slope.

3. The method according to claim 1, wherein the normal direction change rate is obtained by extracting only spatial frequency components which are visually recognizable by a person from a geometric normal direction change rate of the shape of the machined surface of the workpiece.

4. A device for evaluating a machined surface of a workpiece, comprising:

a visible area map storage unit for storing a minimum value of normal direction change rate visible to a person in association with a parameter representing a surface roughness of the machined surface of the workpiece;

a normal direction change rate calculation unit for
setting a plurality of set points at predetermined intervals on the machined surface of the workpiece, and
a normal direction change rate calculation unit for setting a plurality of set points at predetermined intervals on the machined surface of the workpiece, and calculating the normal direction change rate for each of the set points along a plane parallel to horizontal axis and a vertical axis based on a shape of the machine surface using a simulator based on a machining program, where the normal direction change rate is a change rate that is calculated at a first set point of the set points that is mutually adjacent to a second set point of the set points by dividing a difference between a second angle of normal direction of the mutually adjacent second set point with respect to the vertical axis and a first angle of normal direction of the first set point with respect to the vertical axis by distance determined along the horizontal axis between a second coordinate point of the horizontal axis of the mutually adjacent second set point and a first coordinate point of the horizontal axis of the first set point;

a surface roughness parameter calculation unit for calculating the parameter representing the surface roughness of the machined surface of the workpiece using the simulator based on the machining program;

a plotting unit
for generating a visible area map representing a boundary line between a visually recognizable area and a visually unrecognizable area defined by the stored minimum value of the normal direction change rate visible to a person, generating the visible area map by setting the parameter representing the surface roughness as a first axis, and setting the normal direction change rate as a second axis, and for plotting on the visible area map and displaying on a display unit a maximum value of the normal direction change rate and the parameter representing the surface roughness of the machined surface of the workpiece corresponding to the maximum value of the normal direction change rate based on the calculated normal direction change rate and the calculated parameter representing the surface roughness of the machined surface of the workpiece; and, a parameter change unit changes a tool condition, a machining condition, or a control parameter so as to change one or both of the parameter representing the surface roughness of the machined surface of the workpiece and the normal direction change rate.

5. The device according to claim 4, wherein the parameter representing the surface roughness of the machined surface of the workpiece is a root mean square slope.

6. The device according to claim 4, wherein the normal direction change rate is obtained by extracting only spatial frequency components which are visually recognizable by a person from a geometric normal direction change rate of the shape of the machined surface.

7. A method for machining a workpiece, comprising the steps of:

creating a visible area map by setting a parameter representing a surface roughness of a machined surface of the workpiece as a first axis, setting a normal direction change rate as a second axis, the visible are map representing a boundary line between a visually recognizable area and a visually unrecognizable area defined by a stored minimum value of the normal direction change rate visible to a person corresponding to the parameter representing the surface roughness of the machined surface of the workpiece;

setting a plurality of set points at predetermined intervals on the machined surface of the workpiece;

calculating a shape of the machined surface of the workpiece by a simulator based on a machining program;

calculating a shape of a machined surface of the workpiece by using a simulator based on a machining program, calculating the normal direction change rate for each of the set points along a plane parallel to horizontal axis and a vertical axis, where the normal direction change rate is a change rate that is calculated at a first set point of the set points that is mutually adjacent to a second set point of the set points by dividing a difference between a second angle of normal direction of the mutually adjacent second set point with respect to the vertical axis and a first angle of normal direction of the first set point with respect to the vertical axis by distance determined along the horizontal axis between a second coordinate point of the horizontal axis of the mutually adjacent second set point and a first coordinate point of the horizontal axis of the first set point;

calculating the parameter representing the surface roughness of the machined surface of the workpiece by the simulator based on the machining program;

displaying relationship between the parameter representing the surface roughness of the machined surface of the workpiece and a corresponding maximum value of the normal direction change rate on the visible area map along with the boundary line based on the calculated surface roughness of the machined surface of the workpiece and the calculated normal direction change rate; and changing a tool condition, machining condition, or control parameter so as to change one or both of the parameter representing the surface roughness of the machined surface of the workpiece and the normal direction change rate.

8. The method according to claim 7, wherein the parameter representing the surface roughness of the machined surface of the workpiece is a root mean square slope.

9. The method according to claim 7, wherein the normal direction change rate is obtained by extracting only spatial frequency components which are visually recognizable by a person from a geometric normal direction change rate of the shape of the machined surface of the workpiece.

10. A machine tool which includes a feed device having at least three orthogonal axes, the machine tool machines a workpiece by moving a tool mounted on a spindle and the workpiece relative to each other, the machine tool comprising:

a visible area map storage unit for storing a minimum value of normal direction change rate visible to a person in association with a parameter representing a surface roughness of a machined surface of the workpiece;

a normal direction change rate calculation unit for
setting a plurality of set points at predetermined intervals on the machined surface of the workpiece, and
calculating the normal direction change rate for each of the set points along a plane parallel to horizontal axis and a vertical axis based on a shape of the machine surface using a simulator based on a machining program, where the normal direction change rate is a change rate that is calculated at a first set point of the set points that is mutually adjacent to a second set point of the set points by dividing a difference between a second angle of normal direction of the mutually adjacent second set point with respect to the vertical axis and a first angle of normal direction of the first set point with respect to the vertical axis by distance determined along the horizontal axis between a second coordinate point of the horizontal axis of the mutually adjacent second set point and a first coordinate point of the horizontal axis of the first set point;

a surface roughness parameter calculation unit for calculating the parameter representing the surface roughness of the machined surface of the workpiece using the simulator based on the machining program;

a plotting unit
for generating a visible area map representing a boundary line, between a visually recognizable area and a visually unrecognizable area defined by the stored minimum value of the normal direction change rate visible to a person, generating the visible area map by setting the parameter representing the surface roughness as a first axis, and setting the normal direction change rate as a second axis, and
for plotting on the visible area map and displaying on a display unit a maximum value of the normal direction change rate and the parameter representing the surface roughness of the machined surface of the workpiece corresponding to the maximum value of the normal direction change rate based on the calculated normal direction change rate and calculated parameter representing the surface roughness of the machined surface of the workpiece; and a parameter change unit for changing a tool condition, a machining condition, or a control parameter so as to change one or both of the parameter representing the surface roughness of the machined surface of the workpiece and the normal direction change rate.

11. The machine tool according to claim 10, wherein the parameter representing the surface roughness of the machined surface of the workpiece is a root mean square slope.

12. The machine tool according to claim 10, wherein the normal direction change rate is obtained by extracting only spatial frequency components which are visually recognizable by a person from a geometric normal direction change rate of the shape of the machined surface of the workpiece.

* * * * *